(12) United States Patent
Martin et al.

(10) Patent No.: US 9,217,638 B2
(45) Date of Patent: Dec. 22, 2015

(54) ENGINE WITH LASER IGNITION AND MEASUREMENT

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 13/689,578

(22) Filed: Nov. 29, 2012

(65) Prior Publication Data

US 2014/0149019 A1    May 29, 2014

(51) Int. Cl.

| F02P 23/04 | (2006.01) |
|---|---|
| G01B 21/02 | (2006.01) |
| F02D 41/00 | (2006.01) |
| F02D 35/02 | (2006.01) |
| F02D 41/06 | (2006.01) |
| F02P 7/073 | (2006.01) |

(52) U.S. Cl.
CPC .............. G01B 21/02 (2013.01); F02D 35/022 (2013.01); F02D 41/009 (2013.01); F02P 23/04 (2013.01); *F02B 2275/14* (2013.01); *F02D 41/06* (2013.01); *F02D 2041/0092* (2013.01); *F02P 7/073* (2013.01); *Y02T 10/123* (2013.01)

(58) Field of Classification Search
CPC ..... F02D 41/06; F02D 41/009; F02D 35/022; F02N 11/101; F02N 11/0818; F02N 2200/023; F02N 2200/063; F02P 23/04; F02P 7/073; F02P 13/00

USPC ....... 701/103; 123/143 B; 73/114.09, 114.26, 73/114.27, 114.28
See application file for complete search history.

(56) References Cited

U.S. PATENT DOCUMENTS

| 4,362,133 | A | * | 12/1982 | Malik ............................. 477/99 |
| 7,765,980 | B2 | | 8/2010 | Vogel et al. |
| 8,042,510 | B2 | | 10/2011 | Martin et al. |
| 2011/0180030 | A1 | * | 7/2011 | Martin et al. ............. 123/143 B |
| 2013/0118447 | A1 | | 5/2013 | Martin et al. |

FOREIGN PATENT DOCUMENTS

| GB | 2441145 A * | 2/2008 | ............. F02P 23/04 |
| JP | 2008045496 A | 2/2008 | |

OTHER PUBLICATIONS

Martin, Douglas Raymond et al., "Engine with Laser Ignition and Measurement," U.S. Appl. No. 13/689,601, filed Nov. 29, 2012, 44 pages.

(Continued)

*Primary Examiner* — Hai Huynh
*Assistant Examiner* — Gonzalo Laguarda
(74) *Attorney, Agent, or Firm* — Julia Voutyras; Alleman Hall McCoy Russell & Tuttle LLP

(57) ABSTRACT

Systems and methods for increasing an efficiency of engine starting of a hybrid vehicle are disclosed. In one example approach, a method comprises operating a laser ignition device in an engine cylinder and identifying engine position in response thereto; and igniting an air and fuel mixture in the cylinder with the laser ignition device.

19 Claims, 12 Drawing Sheets

(56) References Cited

OTHER PUBLICATIONS

Martin, Douglas Raymond et al., "Laser Ignition and Misfire Monitor," U.S. Appl. No. 13/677,641, filed Nov. 15, 2012, 30 pages.
Martin, Douglas Raymond et al., "Laser Ignition System Based Diagnostics," U.S. Appl. No. 13/865,088, filed Apr. 17, 2013, 41 pages.
Martin, Douglas Raymond et al., "Laser Ignition System Based Diagnostics," U.S. Appl. No. 13/865,089, filed Apr. 17, 2013, 40 pages.
Martin, Douglas R. et al., "Laser Ignition Safety Interlock System and Method," U.S. Appl. No. 13/870,327, filed Apr. 25, 2013, 30 pages.
Martin, Douglas R. et al. "Laser Ignition System Based Diagnostics," U.S. Appl. NO. 13/865,088, filed Apr. 17, 2013, 41 pages.
Martin, Douglas R. et al., "Laser Ignition System Based Diagnostics," U.S. Appl. No. 13/865,089, filed Apr. 17, 2013, 40 pages.
Martin, Douglas R. et al., "Laser Ignition System Based Diagnostics," U.S. Appl. No. 14/152,811, filed Jan. 10, 2014, 85 pages.
Martin, Douglas R. et al., "Laser Ignition System Based Diagnostics," U.S. Appl. No. 14/152,833, filed Jan. 10, 2014, 85 pages.
Martin, Douglas R. et al., "Laser Ignition System Based Diagnostics," U.S. Appl. No. 14/152,851, filed Jan. 10, 2014, 84 pages.
Martin, Douglas R. et al., "Laser Ignition and Misfire Monitor," U.S. Appl. No. 13/677,641, filed Nov. 15, 2012, 30 pages.

* cited by examiner

LD1 – Laser Detection Mode 1: Piston Position
LD2 – Laser Detection Mode 2: Position of Intake Valve

ENGINE WITH LASER IGNITION AND MEASUREMENT

BACKGROUND AND SUMMARY

On hybrid electric vehicles (HEV) and stop-start vehicles, an internal combustion engine (ICE) may shut-down or deactivate during selected conditions. Shutting down the engine may save fuel by avoiding certain conditions, such as idling conditions, for example. When this happens, the crankshaft and camshafts of the engine may stop in unknown positions of the engine cycle. In order to restart the engine, the position of the cams/pistons may be determined so that sequential and accurate fueling, and spark timing, may be provided to obtain reliable low emissions starts. As such, precise and timely knowledge of engine piston and cam positions during the start may enable coordination of the spark timing and fuel delivery in the engine.

Some methods of piston or engine position determination rely on a crankshaft timing wheel with a finite number of teeth and a gap to provide synchronization in coordination with camshaft measurements. Because the crankshaft position information is typically produced using a toothed wheel with a missing tooth, an engine control module can determine relative engine position to each cylinder. The crankshaft rotates twice per engine cycle, so to uniquely identify the engine position information for the crankshaft is combined with a cylinder identification (CID). When restarting an engine, the engine control module therefore typically waits for a determination of the engine position before commencing sequential fuel injection, which incurs a delay time in the reactivation process. One example is shown by U.S. Pat. No. 7,765,980, where engine position is identified via a crankshaft angle sensor.

The inventors herein have recognized issues with such approaches. For example, depending on engine temperature, the amount of time to identify crankshaft position relative to camshaft position can vary. Such variability in determining the relative positioning between the camshaft and crankshaft (in order to identify engine and piston positions) can lead to reduced ability in achieving and maintaining fast synchronization, reliable combustion, and reduced emissions. Further, any delays in identifying engine position can also delay engine starting. When restarting the engine in response to a vehicle launch request, such delays then translate to delays in vehicle response, reducing customer satisfaction.

In one example approach, some of the above issues may be addressed by a method comprising operating a laser ignition device in an engine cylinder and synchronizing fuel delivery based on a laser sensed engine position, and igniting an air and fuel mixture in the cylinder with the laser ignition device. In this way, it may be possible to take advantage of a laser ignition system to increase an accuracy of engine position identification (via cam and piston position measurements), such as during engine starting. For example, such an approach may provide faster and more accurate information on engine/piston position, velocity, etc. By identifying such information earlier during engine cranking (or even before cranking), faster synchronization with the camshaft may be achieved leading to earlier fuel delivery and engine combustion. An advantage of the above aspect of the invention is faster average engine starting time as well as improved customer satisfaction, improved fuel economy, and reduced emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
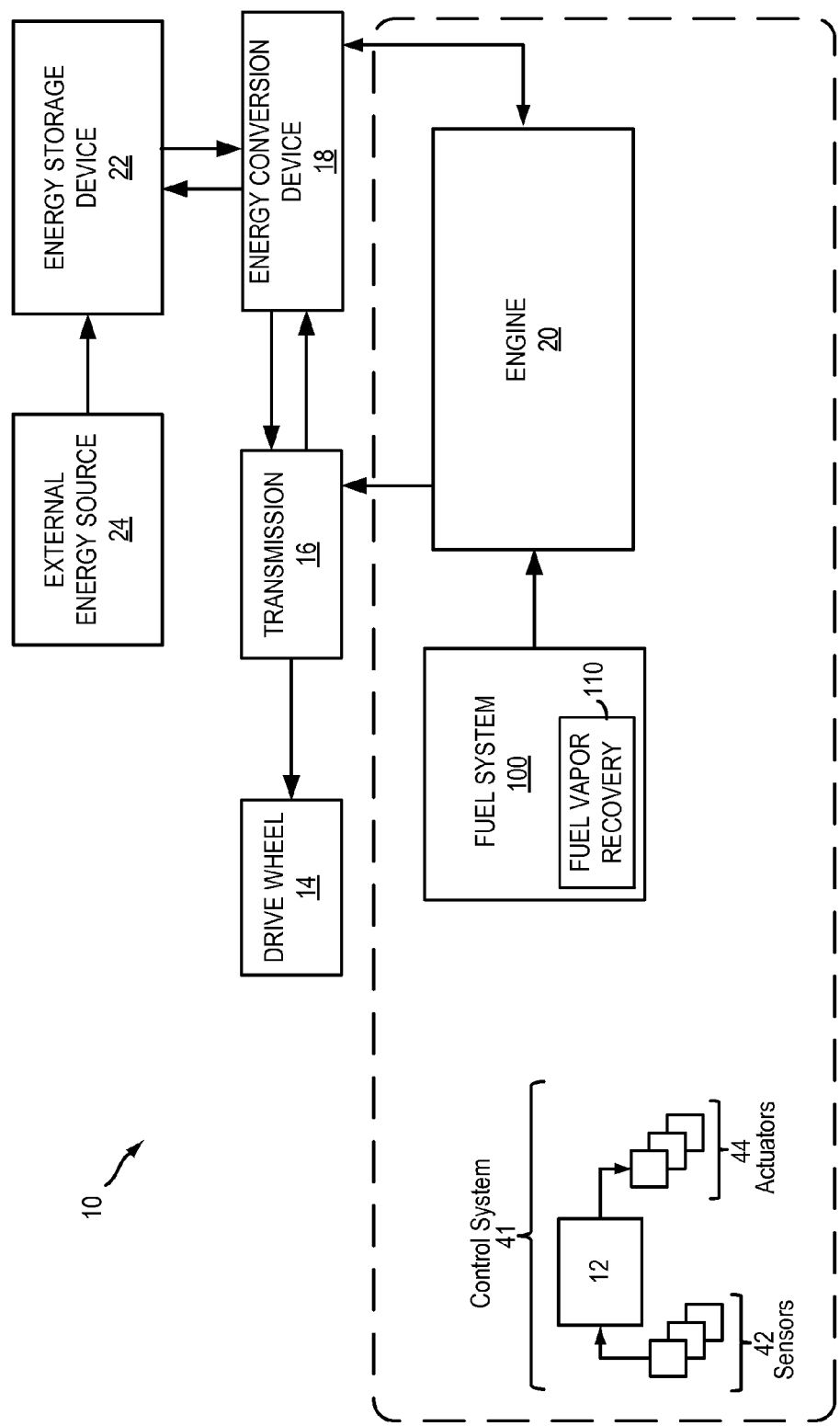
FIG. 1 shows a schematic depiction of an example hybrid vehicle.
Figure 2:
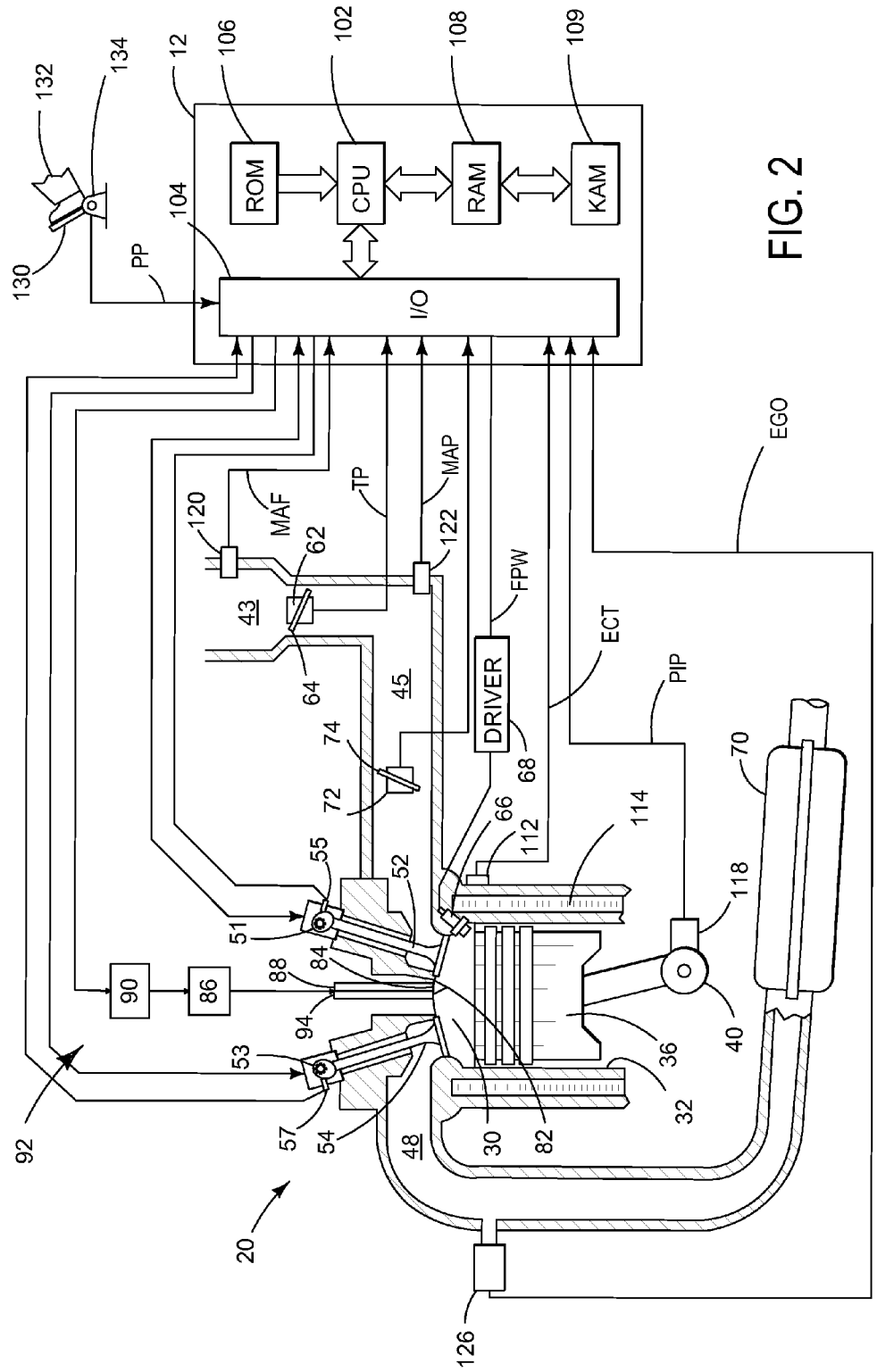
FIG. 2 shows a schematic diagram of an example internal combustion engine.
Figure 3:
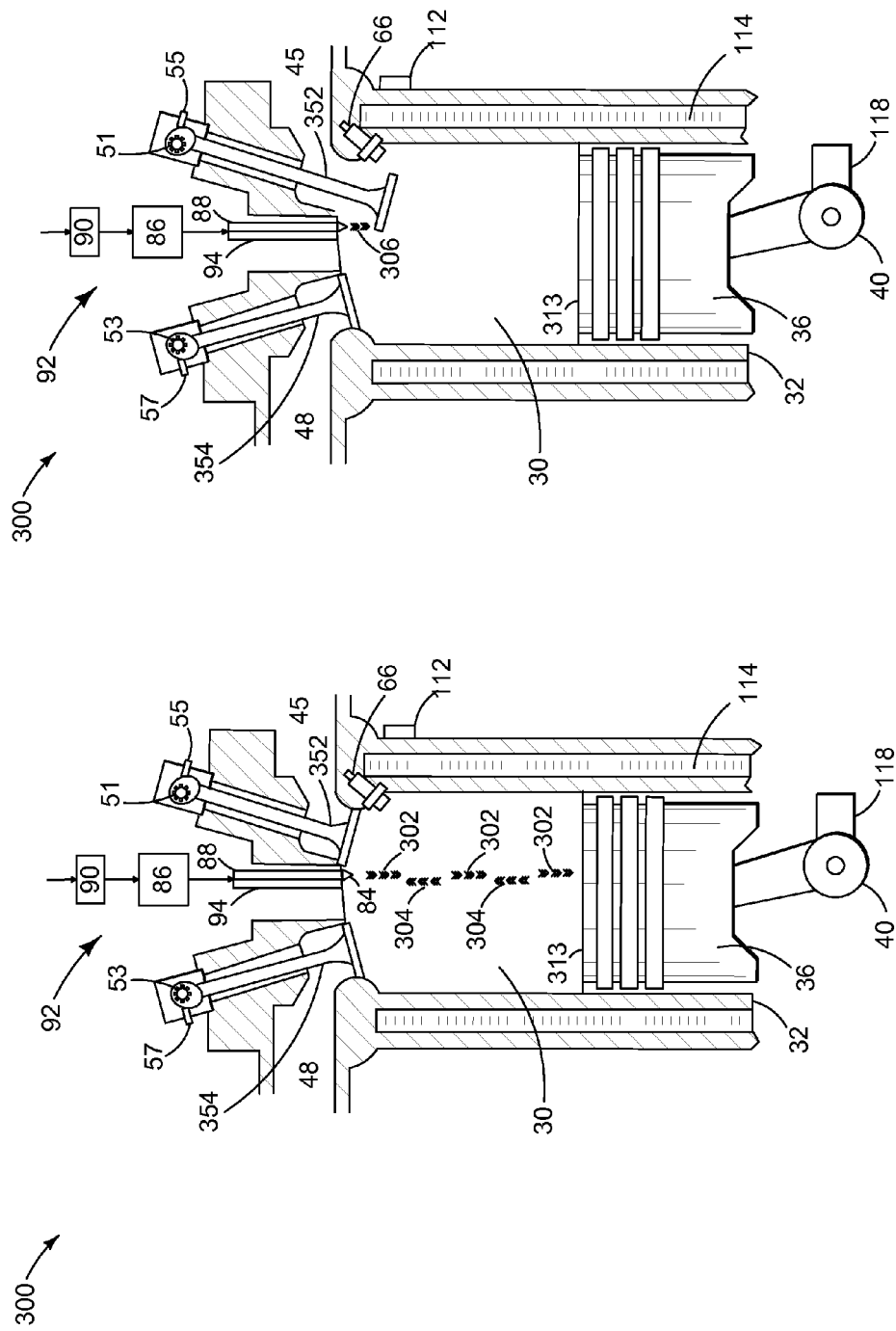
FIGS. 3a and 3b show schematic diagrams of an example cylinder of an engine.
Figure 4:
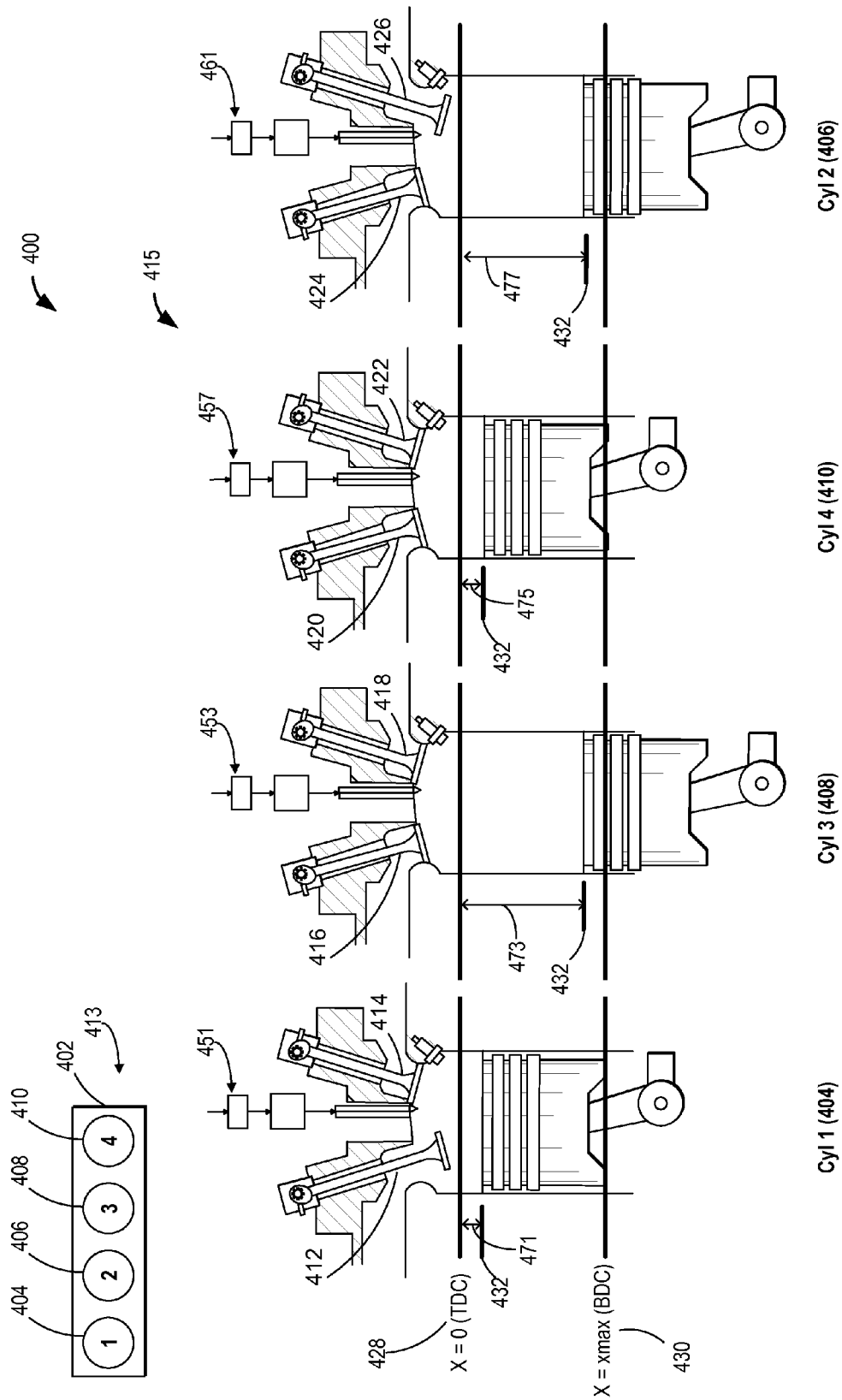
FIG. 4 shows an example four cylinder engine stopped at a random position in its drive cycle.
Figure 5:
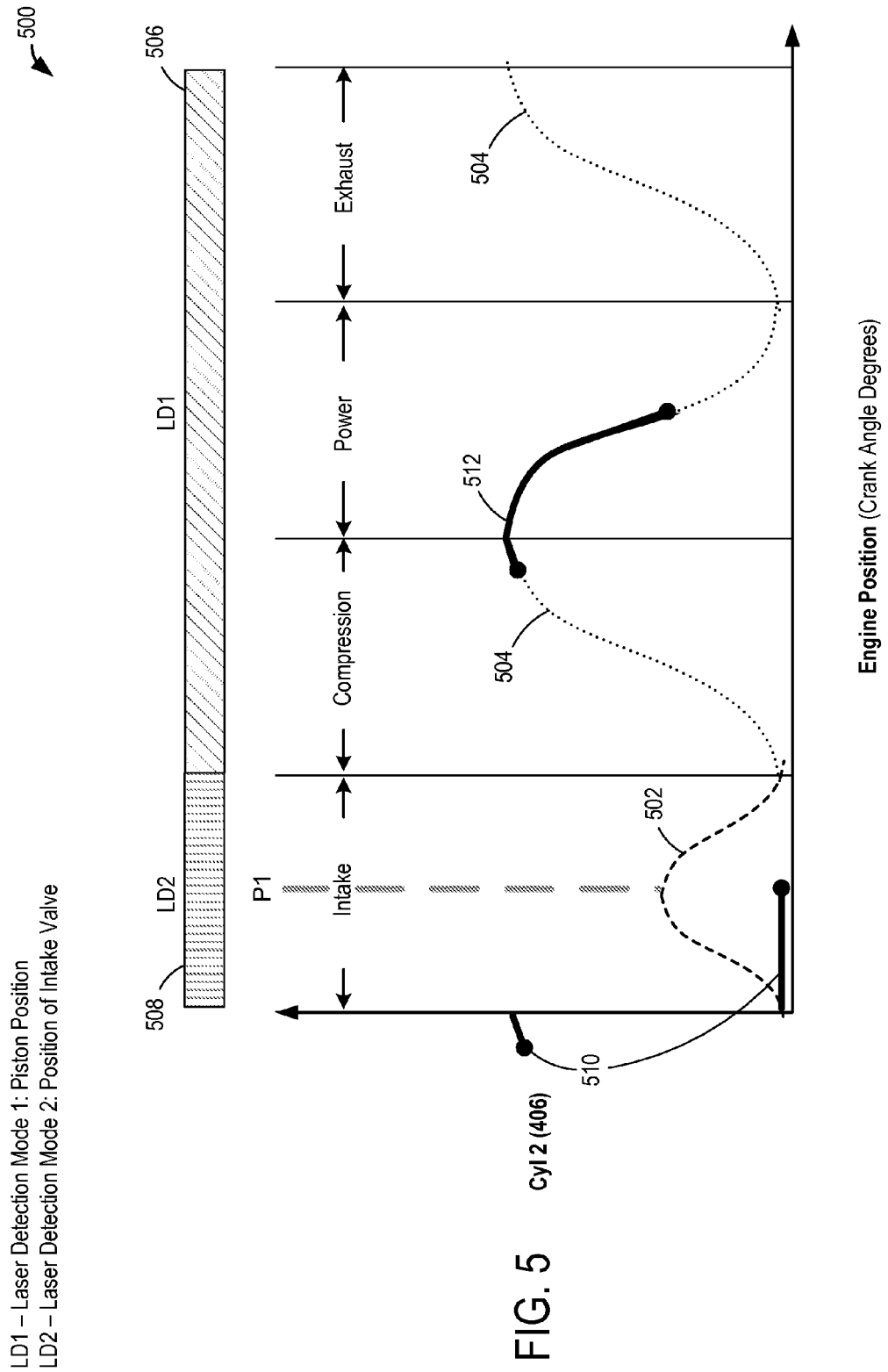
FIG. 5 shows two operational modes of the laser system during an example engine cycle and exemplary data for uniquely identifying the position of the engine using a laser system.
Figure 6:
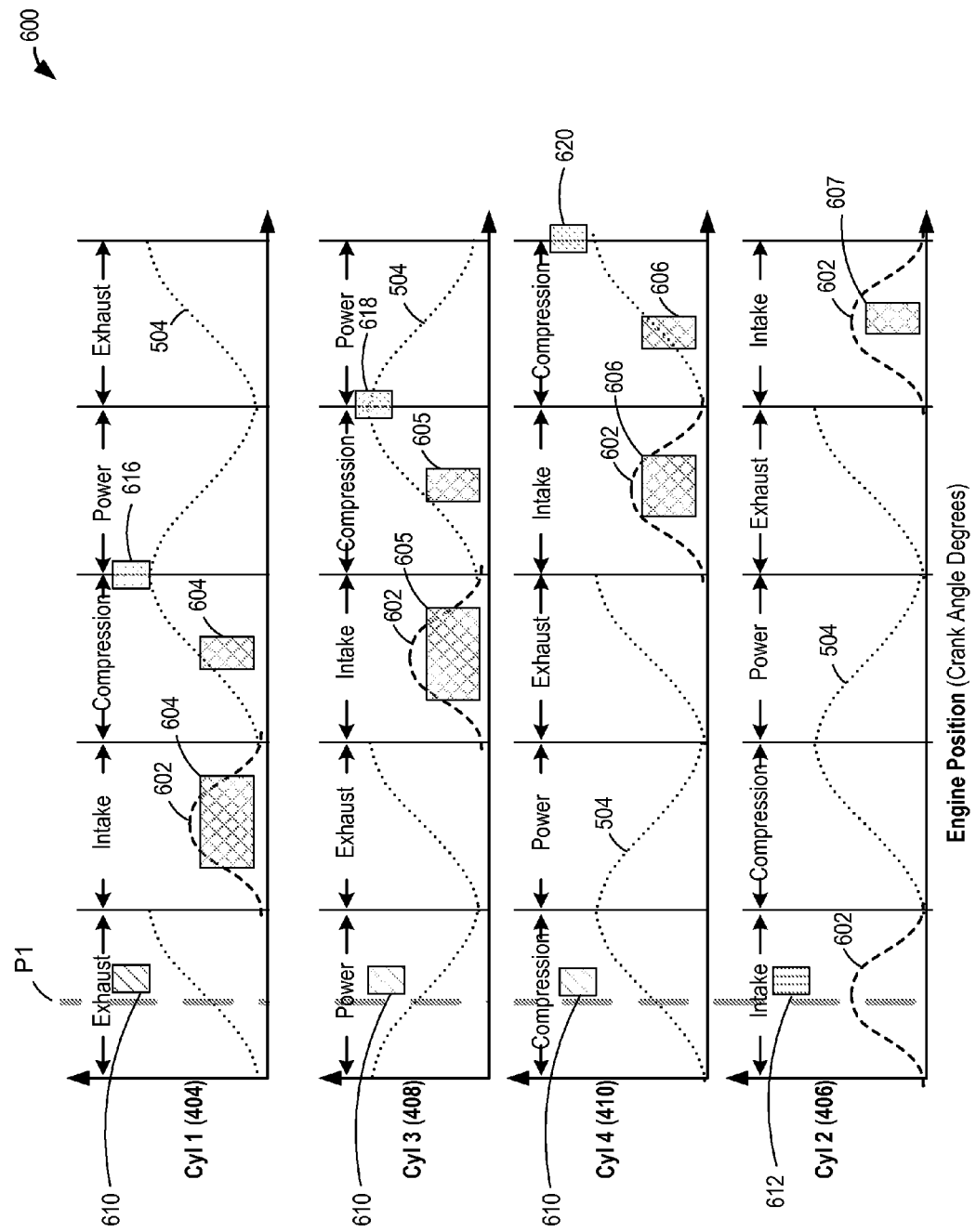
FIG. 6 shows an example map of valve timing and piston position with respect to an engine position during an example engine cycle for a direct injection engine.
Figure 7:
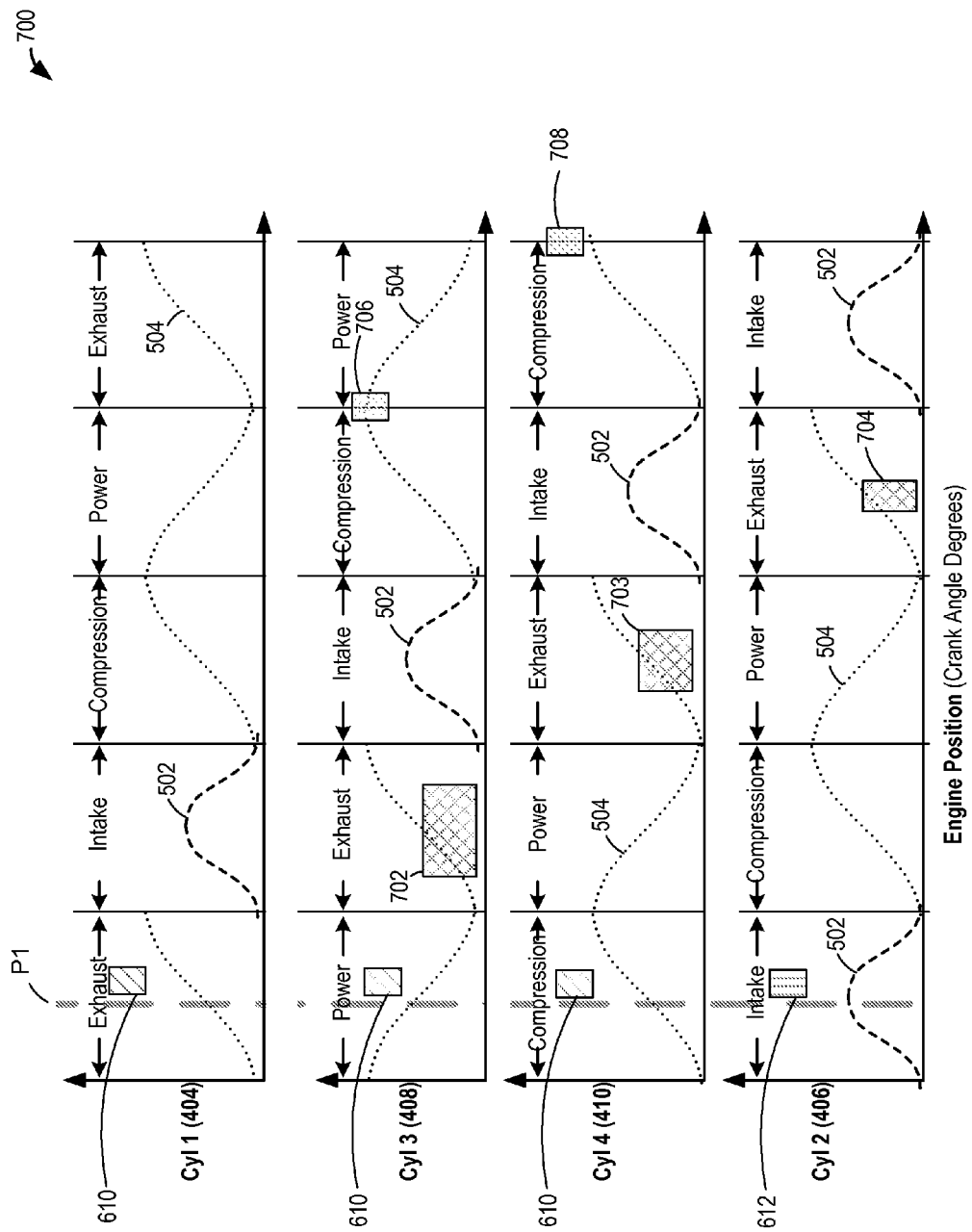
FIG. 7 shows an example map of valve timing and piston position with respect to an engine position during an example engine cycle for a port fuel injection engine.

Methods and systems are provided for increasing an efficiency of engine starting of a hybrid vehicle such as shown in FIG. 1. In one example, cam and piston position determination and accuracy may be achieved earlier and faster in an engine starting sequence using a laser ignition system coupled to an engine system, such as shown in FIGS. 2-4. For example, to increase data rate cam timing sensing information, the feedback control adjustments may be based on laser pulses within an engine cylinder as a means of determining cam and piston position when optimizing fuel delivery. A controller then maintains valve timing at a desired value based on feedback of cam position relative to crankshaft position. FIG. 5 shows two detection modes of a laser system during an example engine cycle and exemplary data for uniquely identifying the position of the engine using the laser system. FIGS. 6-7 show maps of piston position and valve timing for direct injection and port fuel injected engines, respectively. For the sample engine position of FIG. 4, these maps illustrate how a laser system coupled to a controller may operate in two power modes during the engine drive cycle. For example, a low-power mode may be used to determine the position of the engine while a high-power mode may be used to ignite the air/fuel mixture. The system is controlled by a controller according to various routines, illustrated in FIGS. 8-12. These figures illustrate various example control routines for increasing efficiency of engine starting that may be carried out by a control system of the engine of FIGS. 1-2.

Referring to FIG. 1, the figure schematically depicts a vehicle with a hybrid propulsion system 10. Hybrid propulsion system 10 includes an internal combustion engine 20 coupled to transmission 16. Transmission 16 may be a manual transmission, automatic transmission, or combinations thereof. Further, various additional components may be included, such as a torque converter, and/or other gears such as a final drive unit, etc. Transmission 16 is shown coupled to drive wheel 14, which may contact a road surface.

In this example embodiment, the hybrid propulsion system also includes an energy conversion device 18, which may include a motor, a generator, among others and combinations thereof. The energy conversion device 18 is further shown coupled to an energy storage device 22, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (in other words, provide a generator operation). The energy conversion device may also be operated to supply an output (power, work, torque, speed, etc.) to the drive wheel 14 and/or engine 20 (in other words, provide a motor operation). It should be appreciated that the energy conversion device may, in some embodiments, include a motor, a generator, or both a motor and generator, among various other components used for providing the appropriate conversion of energy between the energy storage device and the vehicle drive wheels and/or engine.

The depicted connections between engine 20, energy conversion device 18, transmission 16, and drive wheel 14 may indicate transmission of mechanical energy from one component to another, whereas the connections between the energy conversion device 18 and the energy storage device 22 may indicate transmission of a variety of energy forms such as electrical, mechanical, etc. For example, torque may be transmitted from engine 20 to drive the vehicle drive wheel 14 via transmission 16. As described above, energy storage device 22 may be configured to operate in a generator mode and/or a motor mode. In a generator mode, system 10 may absorb some or all of the output from engine 20 and/or transmission 16, which may reduce the amount of drive output delivered to the drive wheel 14. Further, the output received by the energy conversion device may be used to charge energy storage device 22. Alternatively, energy storage device 22 may receive electrical charge from an external energy source 24, such as a plug-in to a main electrical supply. In motor mode, the energy conversion device may supply mechanical output to engine 20 and/or transmission 16, for example by using electrical energy stored in an electric battery.

Hybrid propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

From the above, it should be understood that the exemplary hybrid propulsion system is capable of various modes of operation. For example, in a first mode, engine 20 is turned on and acts as the torque source powering drive wheel 14. In this case, the vehicle is operated in an "engine-on" mode and fuel is supplied to engine 20 (depicted in further detail in FIG. 2) from fuel system 100. Fuel system 100 includes a fuel vapor recovery system 110 to store fuel vapors and reduce emissions from the hybrid vehicle propulsion system 10.

In another mode, the propulsion system may operate using energy conversion device 18 (e.g., an electric motor) as the torque source propelling the vehicle. This "engine-off" mode of operation may be employed during braking, low speeds, while stopped at traffic lights, etc. In still another mode, which may be referred to as an "assist" mode, an alternate torque source may supplement and act in cooperation with the torque provided by engine 20. As indicated above, energy conversion device 18 may also operate in a generator mode, in which torque is absorbed from engine 20 and/or transmission 16. Furthermore, energy conversion device 18 may act to augment or absorb torque during transitions of engine 20 between different combustion modes (e.g., during transitions between a spark ignition mode and a compression ignition mode).

The various components described above with reference to FIG. 1 may be controlled by a vehicle control system 41, which includes a controller 12 with computer readable instructions for carrying out routines and subroutines for regulating vehicle systems, a plurality of sensors 42, and a plurality of actuators 44.

FIG. 2 shows a schematic diagram of an example cylinder of multi-cylinder internal combustion engine 20. Engine 20 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 20 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

Engine 20 may optionally include cam position sensors 55 and 57. However, in the example shown, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 may have toothed wheels. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 43 in a configuration that provides what is known as port injection of fuel into the intake port upstream of combustion cylinder 30.

Intake passage 43 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 43 may include a mass air flow sensor 120 and a manifold air pressure sensor 122 for providing respective signals MAF and MAP to controller 12.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air/fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 2 as a microcomputer, including microprocessor unit 102, input/output ports 104, an electronic storage medium for executable programs and calibration values shown as read-only memory chip 106 in this particular example, random access memory 108, keep alive memory 109, and a data bus. The controller 12 may receive various signals and information from sensors coupled to engine 20, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; and absolute manifold pressure signal, MAP, from sensor 122. The Hall effect sensor 118 may optionally be included in engine 20 because it functions in a capacity similar to the engine laser system described herein. Storage medium read-only memory 106 can be programmed with computer readable data representing instructions executable by processor 102 for performing the methods described below as well as variations thereof.

Laser system 92 includes a laser exciter 88 and a laser control unit (LCU) 90. LCU 90 causes laser exciter 88 to generate laser energy. LCU 90 may receive operational instructions from controller 12. Laser exciter 88 includes a laser oscillating portion 86 and a light converging portion 84. The light converging portion 84 converges laser light generated by the laser oscillating portion 86 on a laser focal point 82 of combustion cylinder 30.

Laser system 92 is configured to operate in more than one capacity with the timing of each operation based on engine position of a four-stroke combustion cycle. For example, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward. In a second operating capacity, LCU 90 may deliver low powered pulses to determine piston and valve position during the four-stroke combustion cycle. For example, upon reactivating an engine from idle-stop conditions, laser energy may be utilized to monitor the position, velocity, etc. of the engine in order to synchronize fuel delivery and valve timing.

LCU 90 may direct laser exciter 88 to focus laser energy at different locations depending on operating conditions. For example, the laser energy may be focused at a first location away from cylinder wall 32 within the interior region of cylinder 30 in order to ignite an air/fuel mixture. In one embodiment, the first location may be near top dead center (TDC) of a power stroke. Further, LCU 90 may direct laser exciter 88 to generate a first plurality of laser pulses directed to the first location, and the first combustion from rest may receive laser energy from laser exciter 88 that is greater than laser energy delivered to the first location for later combustions.

Controller 12 controls LCU 90 and has non-transitory computer readable storage medium including code to adjust the location of laser energy delivery based on temperature, for example the ECT. Laser energy may be directed at different locations within cylinder 30. Controller 12 may also incorporate additional or alternative sensors for determining the operational mode of engine 20, including additional temperature sensors, pressure sensors, torque sensors as well as sensors that detect engine rotational speed, air amount and fuel injection quantity. Additionally or alternatively, LCU 90 may directly communicate with various sensors, such as temperature sensors for detecting the ECT, for determining the operational mode of engine 20.

As described above, FIG. 2 shows one cylinder of a multi-cylinder engine, and each cylinder may similarly include its own set of intake/exhaust valves, fuel injector, laser ignition system, etc.

When not igniting the air/fuel mixture at high power, the laser system 92 may emit low power pulses to precisely measure the distance from the top of the cylinder to the piston, or for CID to determine whether intake and/or exhaust valves are in the open or closed position. For example, two off-the-shelf laser products accurately measure distances from 2 inches to greater than 100 feet accurate to within ⅛ of an inch (Johnson Level & Tool Mfg. Col, Inc., Mequon, Wis.; and DeWalt Industrial Tool Col, Baltimore, Md.). FIGS. 3a and 3b show example operations of the laser system 92 that includes a laser exciter 88, detection system 94 and LCU 90. LCU 90 causes laser exciter 88 to generate a low powered laser pulse shown at 302, which may be directed towards top surface 313 of piston 36. After emission, the light energy may be reflected off of the piston and detected by the sensor 94. LCU 90 may receive operational instructions, such as a power mode, from controller 12. For example, during ignition, the laser pulse used may be pulsed quickly with high energy intensity to ignite the air/fuel mixture. Conversely, to determine the engine position, the controller may direct the laser system to sweep frequency at low energy intensity to determine piston position and identify one or more valve positions. For instance, frequency-modulating a laser with a repetitive linear frequency ramp may allow a determination of one or more piston positions in an engine. A detection sensor 94 may be located in the top of the cylinder as part of the laser system and may be calibrated to receive return pulse 304 reflected from top surface 313 of piston 36.

FIGS. 3a and 3b illustrate how laser system 92 may emit pulses in the direction of piston 36 in cylinder 30 described above with reference to FIG. 2. Pulses emitted by laser system 92, e.g., pulse 302 shown in FIG. 3a, may be directed toward a top surface 313 of piston 36. Pulse 302 may be reflected from the top surface of the piston and a return pulse, e.g., pulse 304, may be received by laser system 92, which may be used to determine a position of piston 36 within cylinder 30.

In some examples, the location of the piston may be determined by frequency modulation methods using frequency-modulated laser beams with a repetitive linear frequency ramp. Alternatively, phase shift methods may be used to determine the distance. By observing the Doppler shift or by comparing sample positions at two different times, piston position, velocity and engine speed information (RPM measurement) may be inferred. The positions of intake valve 352 and/or exhaust valve 354 may also be determined using a laser system. When CID is combined with piston location, the position of the engine may be determined and used to synchronize fuel delivery and valve timing. Such positional states of the engine may be based on piston positions and CIDs determined via lasers.

Controller 12 may further control LCU 90 and include non-transitory computer readable storage medium including code to adjust the location of laser energy delivery based on operating conditions, for example based on a position of the piston 36 relative to TDC. Controller 12 may also incorporate additional or alternative sensors for determining the operational mode of engine 20, including additional temperature sensors, pressure sensors, torque sensors as well as sensors that detect engine rotational speed, air amount and fuel injection quantity as described above with regard to FIG. 2. Additionally or alternatively, LCU 90 may directly communicate with various sensors, such as Hall effect sensors 118, whose inclusion is optional, for determining the operational mode of engine 20.

A laser system may be utilized to measure cam position by, for instance, blocking emitted pulses during certain strokes of the engine cycle. For instance, in one embodiment, laser system 92 may be located near intake valve 352 so a measurement of piston position within the cylinder is prevented during the intake stroke of the drive cycle. During the intake stroke, valve 352 opens into the chamber and blocks emitted laser pulses from reflecting off of the top surface of the piston 313. For example, in FIG. 3b, because laser system 92 is placed in close proximity to intake valve 352, when cylinder 30 is in its intake stroke, valve 352 opens into the chamber and blocks the laser pulse, e.g. laser pulse 306, from reaching the top surface of the piston 313. Controller 12 may still be programmed to interpret the signal detected in order to determine the positions of the cams. For instance, in this example the controller may process a lack of signal received by sensor 94 to indicate that intake valve 352 is in the open position. This information and the geometry of the engine may be further processed by the controller to determine the position of the engine within its drive cycle. Although FIG. 3b exemplifies how an emitted pulse may be blocked by intake valve 352, other configurations are possible. For instance, the laser system may be located in close proximity to the exhaust valve instead of the intake valve. When placed in this location, pulses emitted may instead be blocked during the exhaust stroke of the drive cycle. A controller can be calibrated to account for such differences. As described in detail below, controller 12 can process data collected during the drive cycle to determine engine position.

The difference in time between emission of light pulse 302 and detection of the reflected light pulse 304 by detector sensor 94 can be further compared to a time threshold as a means of determining whether degradation of the laser device has occurred. For example, in an internal combustion engine, the combustion chamber may be three to four inches in length. Based on this estimate, and the speed of light in a vacuum ($c=3.0\times10^8$ m/s), a pulse of light emitted by laser system 92 reflected from the top surface of piston 313 may be detected in the picosecond time range. A time threshold well beyond the expected picosecond time range (e.g. 1 nanosecond) may therefore be adopted as a reference to indicate degradation of the laser system. For example, a pulse emitted by laser system 92 whose detection by sensor 94 takes longer than 1 nanosecond may indicate a laser system out of alignment.

In some examples, engine system 20 may be included in a vehicle developed to perform an idle-stop when idle-stop conditions are met and automatically restart the engine when restart conditions are met. Such idle-stop systems may increase fuel savings, reduce exhaust emissions, noise, and the like. In such engines, engine operation may be terminated at a random position within the drive cycle. Upon commencing the process to reactivate the engine, a laser system may be used to determine the specific position of the engine. Based on this assessment, a laser system may make a determination as to which cylinder is to be fueled first in order to begin the engine reactivation process from rest. In vehicles configured to perform idle-stop operations, wherein engine stops and restarts are repeated multiple times during a drive operation, stopping the engine at a desired position may provide for more repeatable starts, and thus the laser system may be utilized to measure engine position during the shutdown (after deactivation of fuel injection, spark ignition, etc.) while the engine is spinning down to rest, so that motor torque or other drag torque may be variably applied to the engine, responsive to the measured piston/engine position, in order to control the engine stopping position to a desired stopping position.

In another embodiment, when a vehicle shuts down its engine, either because the motor is turned off or because the vehicle decides to operate in electric mode, the cylinders of the engine may eventually stop in an uncontrolled way with respect to the location of the piston 36 in combustion cylinder 30 and the positions of intake valve 352 and exhaust valve 354. For an engine with four or more cylinders, there may always be a cylinder located between exhaust valve closing (EVC) and intake valve closing (IVC) when the crankshaft is at rest. FIG. 4 shows as an example an in-line four cylinder engine capable of directly injecting fuel into the chamber, stopped at a random position in its drive cycle, and how the laser ignition system may provide measurements that can be compared among the cylinders to identify potential degradation. It will be appreciated that the example engine position shown in FIG. 4 is exemplary in nature and that other engine positions are possible.

Inset in the figure at 413 is a schematic of an example in-line engine block 402. Within the block are four individual cylinders where cylinders 1-4 are labeled 404, 406, 408 and 410 respectively. Cross-sectional views of the cylinders are shown arranged according to their firing order in an example drive cycle shown at 415. In this example, the engine position is such that cylinder 404 is in the exhaust stroke of the drive cycle. Exhaust valve 412 is therefore in the open position and intake valve 414 is closed. Because cylinder 408 fires next in the cycle, it is in its power stroke and so both exhaust valve 416 and intake valve 418 are in the closed position. The piston in cylinder 408 is located near BDC. Cylinder 410 is in the compression stroke and so exhaust valve 420 and intake valve 422 are also both in the closed position. In this example, cylinder 406 fires last and so is in an intake stroke position. Accordingly, exhaust valve 424 is closed while intake valve 426 is open.

Each individual cylinder in an engine may include a laser system coupled thereto as shown in FIG. 2 described above wherein laser system 92 is coupled to cylinder 30. These laser systems may be used for both ignition in the cylinder and determining cam and piston position within the cylinder as described herein. For example, FIG. 4 shows laser system 451 coupled to cylinder 404, laser system 453 coupled to cylinder 408, laser system 457 coupled to cylinder 410, and laser system 461 coupled to cylinder 406.

As described above, a laser system may be used to measure valve positions as well as the position of a piston within a cylinder chamber. For example, in the engine position shown in FIG. 3b, light from laser system 92 may be at least partially blocked from reaching the top of piston 313 in cylinder 30. Because the amount of light reflected is reduced compared to the amount of light reflected off of the top surface of the piston when emitted pulses are not blocked, controller 12 may be programmed to account for such differences and use the information to determine that intake valve 352 is open. Based on the order of valve operations within the drive cycle, controller 12 further determines that exhaust valve 354 is closed. Because the example given is based on a four cylinder engine, one of the cylinders will be in an intake stroke at all times. As such, the controller may be programmed to process data from all laser systems in order to identify a cylinder in its intake stroke. Based on this determination, and using the geometry of the engine, the position of the engine can be identified using the laser systems. Alternatively, as will be described in further detail below, a controller may also be programmed to process a series of measurements from a single laser detector coupled to a cylinder as a means of identifying the position of the engine.

The positions of the pistons in a cylinder may be measured relative to any suitable reference points and may use any suitable scaling factors. For example, the position of a cylinder may be measured relative to a TDC position of the cylinder and/or a BDC position of the cylinder. For example, FIG. 4 shows line 428 through cross-sections of the cylinders at the TDC position and line 430 through cross-sections of the cylinders in the BDC position. Although a plurality of reference points and scales may be possible during a determination of piston position, the examples shown here are based on the location of the piston within a chamber. For instance, a scale based on a measured offset compared to known positions within the chamber may be used. In other words, the distance of the top surface of a piston, shown at 432 in FIG. 4, relative to the TDC position shown at 428 and BDC position shown at 430 may be used to determine a relative position of a piston in the cylinder. For simplicity, a sample scale calibrated for the distance from the laser system to the piston is shown. On this scale, the origin 428 is represented as X (with X=0 corresponding to TDC) and the location 430 of the piston farthest from the laser system corresponding to the maximum linear distance traveled by the piston is represented as xmax (with X=xmax corresponding to BDC). For example, in FIG. 4, a distance 471 from TDC 428 (which may be taken as the origin) to top surface 432 of the piston in cylinder 404 may be substantially the same as a distance 432 from TDC 428 to top surface 432 of the piston in cylinder 410. The distances 471 and 432 may be less than (relative to TDC 428) the distances 473 and 477 from TDC 428 to the top surfaces of pistons in cylinders 408 and 406, respectively.

The pistons may operate cyclically and so their position within the chamber may be related through a single metric relative to TDC and/or BDC. Generally, this distance, 432 in the figure, may be represented as $\Delta X$. A laser system may measure this variable for each piston within its cylinder and then use the information to determine whether further action is to be performed. For instance, a laser system could send a signal to the controller indicating degradation of engine performance beyond an allowable threshold if the variable differs by a threshold amount among two or more cylinders. In this example, the controller may interpret the code as a diagnostic signal and produce a message indicating degradation has occurred. The variable X is understood to represent a plurality of metrics that may be measured by the system, one example of which is described above. The example given is based on the distance measured by the laser system, which may be used to identify the location of the piston within its cylinder.

With reference to FIG. 4, a controller can be programmed to determine the position of the engine using various methods. For example, the controller may be programmed to process a series of data collected from a single laser system, e.g. laser system 461 in cylinder 406, to determine the position of the engine. An example map of a laser system operating in two low power modes to determine intake valve timing and piston position with respect to an engine position during an example engine cycle is shown in FIG. 5 and described below. Alternatively, the controller may be programmed to process data collected from two or more laser systems to determine the position of the engine. FIGS. 6-7 show example maps of valve timing and piston position with respect to an engine position during an example engine cycle for both direct and port fuel injected engines.

FIG. 5 shows a graph 500 of example valve timing and piston position with respect to an engine position (crank angle degrees) within the four strokes (intake, compression, power and exhaust) of the engine cycle for a four cylinder engine with a firing order of 1-3-4-2. Based on the criteria for selecting a first firing cylinder, an engine controller may be configured to identify regions wherein the first firing cylinder may be located based on engine position measured by reflecting laser pulses via a piston as described herein.

In FIG. 5, graph 500 shows intake valve timing and piston position curves along with two example detection modes of the laser system. To determine the position of the engine, a laser system, for example, laser system 461 coupled to cylinder 406 in FIG. 4, can emit a series of low-power pulses throughout the engine cycle, but detect two different light signals based on valve and piston position within a cylinder. With reference to the example shown in FIG. 4, laser system 461 may detect light energy reflected off of the top surface of the piston during the compression, power and exhaust strokes of the drive cycle when the intake valve is closed. Hereinafter, this detection mode shown at 506 in FIG. 5 is referred to as low power detection mode 1 (or LD1). While the laser detector senses light energy reflected from the top of the piston in LD1, it may not sense the position of intake valve 426 relative to exhaust valve 424. Conversely, when the engine cylinder enters the intake stroke of the drive cycle, laser detector 461 may detect a reduced signal since its emission is at least partially blocked by the open intake valve. This detection mode is shown at 508 and is referred to as low power detection mode 2 (or LD2). While in LD2, the laser detector may, for example, sense intake valve position but not the position of the piston within the cylinder chamber. Since a determination of engine position is made from both CID and piston position, during this mode the controller may process information from a second laser system, e.g. laser system 457 coupled to cylinder 410, to measure the position of the piston within the cylinder. The controller may then use this information and the geometry of the engine to identify engine position.

At 502, a valve lift profile is shown for intake valve 426. At the beginning of the intake stroke, the profile shows that the valve opens and then closes while the piston moves from TDC to BDC. Although a valve life profile is not shown for exhaust valve, e.g. exhaust valve 424, a similar profile may be optionally included to show the exhaust valve opens and then closes while the piston moves from BDC to TDC during the exhaust stroke of the engine drive cycle.

At 504, the cyclical nature of the piston is shown for the four strokes of the drive cycle. For example, a piston gradually moves downward from TDC, bottoming out at BDC by the end of the intake stroke. The piston then returns to the top, at TDC, by the end of the compression stroke. The piston then again moves back down, towards BDC, during the power stroke, returning to its original top position at TDC by the end of the exhaust stroke. As depicted, the map illustrates an engine position along the x-axis in crank angle degrees (CAD). For the example curve given, a piston position is not shown during the intake stroke to illustrate the signal being reduced due to substantially blocked laser pulses (e.g. more than 90% blocked).

A series of data collected by laser system 461 may be used to identify the position of the engine. For example, consider an engine stopped with cylinder 406 located at position P1. This may occur, for instance, when an idle-stop vehicle switches engine modes to an electric or vehicle assist mode of operation. After the controller sends a signal to stop the engine, for instance, by sending an electrical signal to the throttle valve telling it to close, air flow to the cylinder may be restricted in order to stop the engine. In response, the engine may fire a few more cycles before coming to a stop at P1. To synchronize fuel delivery and valve timing before re-engaging the engine during the engine reactivation process, controller 12 may then determine the position of the engine.

Sample data sets are shown at 510 and 512 to illustrate how different data sets may be collected by a laser system and used to identify the engine position within the drive cycle. For example, laser system 461 may begin collecting data in response to an engine shutdown command as the engine completes its last few cycles before coming to rest at position P1. Because P1 is located in an intake stroke, 510 shows that the signal collected by the laser detector may be disrupted by the intake valve. As the valve opens, the pulse emitted is at least partially blocked, which may result in a substantially reduced signal. Controller 12 may process this signal to identify the open intake valve and use a laser system coupled another cylinder, e.g. laser system 457 coupled to cylinder 410, to measure its piston position. The geometry of the engine may then be used to relate all of the variables as a means of identifying the engine position.

Because the action of the drive cycle is cyclical in nature, during certain parts of the drive cycle, a second set of data may be collected whose initial curve shape may be substantially identical to that shown in 510. To distinguish these two regions from each other and uniquely identify the position of the engine, the controller may be programmed to process a series of data to determine engine position from curve shape. At 512 a second curve is shown as the piston in cylinder 406 approaches TDC during the compression stroke of the drive cycle. However, because the intake valve remains closed during both the compression and power strokes, no blockage of the laser signal occurs and a smooth set of data is detected. The controller may be programmed to process such data, and use the shape of the curve along with the geometry of the engine, to identify the position of the engine. Once the engine position is determined, a next firing cylinder may be identified and synchronization of fuel delivery and valve timing scheduled.

Alternatively, a controller may be programmed to process information from multiple laser systems in order to determine the position of the engine. For example, in FIG. 6, valve timing and piston position profiles are shown with respect to the engine position shown in FIG. 4. Two operational states of the laser are also shown with reference to FIG. 5 to exemplify how multiple laser systems may be used to determine the engine position.

Shown at 602 are intake valve lift profiles during a normal engine operation. An intake valve may be opened at or before the start of an intake stroke, and may remain open at least until a subsequent compression stroke has commenced. As described above with reference to FIGS. 2-5, the engine controller 12 may be configured to identify a first firing cylinder in which to initiate combustion during engine reactivation from idle-stop conditions. For example, as described above in FIG. 4, the first firing cylinder may be determined using a laser system to measure valve position and the location of a piston in a cylinder as a means of determining the position of the engine. The example shown in FIG. 6 relates to a direct injection engine (DI), wherein the first firing cylinder may be selected to be positioned after EVC, but before the subsequent exhaust valve opening (EVO) (once engine position is identified and the piston position synchronized to the camshaft identified). For comparison, FIG. 7 shows the first firing cylinder of a port fuel injected engine (PFI), wherein the first firing cylinder may be selected to be positioned before IVC.

FIG. 6 herein references FIG. 4 to further elaborate how a determination is made as to which cylinder fires first upon engine reactivation, and how the laser may coordinate timing of the different power modes within the four strokes of the drive cycle. For the example configuration shown in FIG. 4 the position of the engine may be detected by the laser system at line P1 shown in FIG. 6. In this example, at P1, cylinder 404 is in the Exhaust stroke. Accordingly, for this example engine system, cylinder 408 is in a Power stroke, cylinder 410 is in a Compression stroke, and cylinder 406 is in an Intake stroke. In general, before an engine begins the reactivation process, one or more laser systems may fire low power pulses, shown at 610 and 612 in FIG. 6, to determine the position of the engine. For example, laser pulses 610 may be fired at the top surface of pistons within their cylinders. Because both valves are closed in the cylinders where pulse 610 is indicated, the laser systems detect the position of a piston within the cylinder chamber (LD1 in FIG. 5). Conversely, because intake valve 426 is open in cylinder 406, emission of laser pulse 612 is at least partially blocked by the open valve. The laser detector in this cylinder may thus process a substantially reduced signal in order to recognize an open intake valve within the cylinder (LD2 in FIG. 5). Controller 12 may then use this information and piston position data from another laser detection system, e.g. laser systems 451, 453, and 457 in FIG. 4, coupled to cylinders 404, 408, and 410, respectively, to determine the position of the engine. Further, since in this example a DI engine is used, the fuel may be injected into the cylinder chamber after intake valve opening (IVO). The injection profile is given by 604-607. For example, the boxes at 604 in FIG. 6 show when fuel is injected into cylinder 404, boxes 605 show when fuel is injected into cylinder 408, boxes 606 show when fuel is injected into cylinder 410, and box 607 shows when fuel is injected into cylinder 406 during the example engine cycle shown in FIG. 6.

When a cylinder has been identified as a next firing cylinder, after the air/fuel mixture has been introduced into the cylinder and the associated piston has undergone compression, the laser coupled to the identified next firing cylinder may generate a high powered pulse to ignite the air/fuel mixture in the cylinder to generate the power stroke. For example, in FIG. 6, after fuel injection 604 into cylinder 404 a laser system, e.g., laser system 451, generates a high powered pulse at 616 to ignite the fuel in the cylinder. Likewise, cylinder 408, which is next in the cylinder firing sequence after cylinder 404 receives a high powered pulse 618 from a laser system, e.g., laser system 453, to ignite the fuel injected at 605 into cylinder 408. The next firing cylinder after cylinder 408 is cylinder 410, which receives a subsequent high powered pulse 620 from a laser system, e.g., laser system 457, to ignite the fuel injected at 606 into cylinder 410, and so forth.

In FIG. 7, an example PFI engine profile similar to that shown in FIG. 6 for a DI engine is provided for comparison. One difference between a DI engine and a PFI engine relates to whether the fuel is injected directly into the chamber or whether the fuel is injected into the intake manifold to premix with air before entering the combustion chamber. In the DI system shown in FIGS. 2-4, the air is injected directly into the chamber and so mixes with air during the intake stroke of the cylinder. A PFI system alternatively injects the fuel into the intake manifold during the exhaust stroke so the air and fuel premix before being injected into the cylinder chamber. Because of this difference, an engine controller may send a different set of instructions depending on the type of fuel injection system present in the system.

In the PFI engine profile shown in FIG. 7, before time P1, one or more laser systems may fire low power pulses 610 and 612 to determine the position of the engine. Because the engine is PFI, fuel may be injected into an intake manifold before IVO. At time P1, the controller has identified engine piston position via the laser measurements and has identified camshaft position so that synchronized fuel delivery may be scheduled. Based on the amount of fuel to be delivered, the controller may identify the next cylinder to be fueled before IVO so that closed valve injection of port injected fuel can be provided. The injection profiles are shown at 702-704 in FIG. 7.

For example, referencing FIG. 4, but with respect to a PFI engine instead of a DI engine, the box at 702 shows when fuel may be injected into the intake manifold (shown generally as 45 in FIGS. 2 and 3) of the first firing cylinder after engine reactivation. As shown by FIG. 7, cylinder 408 is the next cylinder that can be fueled, and so a fuel injection 702 is scheduled so that cylinder 408 is the first cylinder to fire from rest when ignited via laser ignition pulse 706. Upon reactivation, since cylinder 410 is next in the firing sequence, fuel injection 703 may occur according to the sequence before IVO. Before EVO, a high powered pulse 708 may be delivered from laser system 457 to ignite the mixture. The next firing cylinder in the sequence is cylinder 406, which subsequently injects fuel 704 before IVO. Although not shown, a high powered laser pulse from laser system 461 may be used to ignite this air/fuel mixture. The amount of fuel injection may gradually be reduced based on the combustion count from the first cylinder combustion event.

Figure 8:
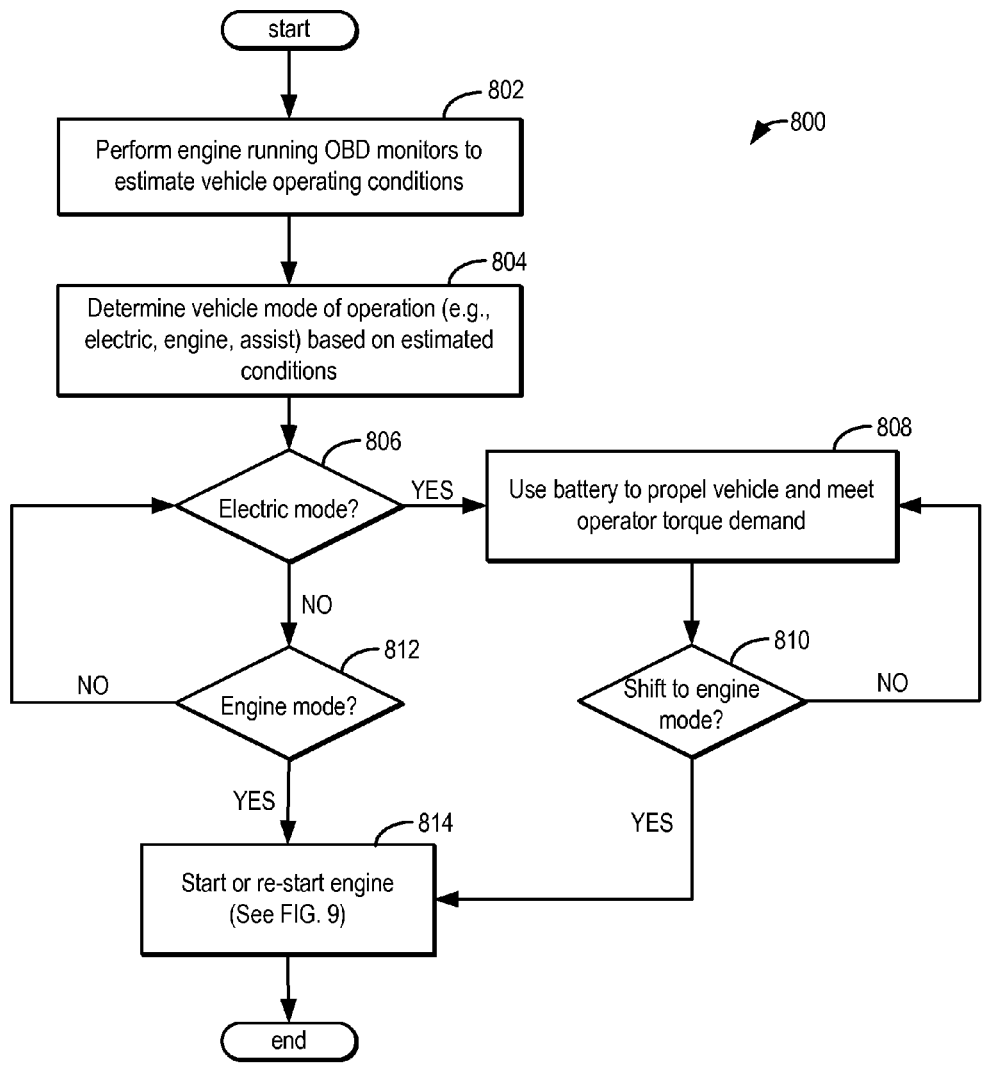
FIG. 8 shows an example method for completing various on-board diagnostic routines during an engine operation of a vehicle drive cycle.

Now turning to FIG. 8, an example method 800 is shown for completing various on-board diagnostic routines during an engine operation of a vehicle drive cycle.

At 802, vehicle operating conditions may be estimated and/or inferred. As described above, the control system 12 may receive sensor feedback from one or more sensors associated with the vehicle propulsion system components, for example, measurement of inducted mass air flow (MAF) from mass air flow sensor 120, engine coolant temperature (ECT), throttle position (TP), etc. Operating conditions estimated may include, for example, an indication of vehicle operator requested output or torque (e.g., based on a pedal position), a fuel level at the fuel tank, engine fuel usage rate, engine temperature, state of charge (SOC) of the on-board energy storage device, ambient conditions including humidity and temperature, engine coolant temperature, climate control request (e.g., air-conditioning or heating requests), etc.

At 804, based on the estimated vehicle operating conditions, a mode of vehicle operation may be selected. For example, it may be determined whether to operate the vehicle in an electric mode (with the vehicle being propelled using energy from an on-board system energy storage device, such as a battery), or an engine mode (with the vehicle being propelled using energy from the engine), or an assist mode (with the vehicle being propelled using at least some energy from the battery and at least some energy from the engine).

At 806, method 800 includes determining whether or not to operate the vehicle in an electric mode. For example, if the period of time the engine has idled is greater than a threshold, the controller may optionally determine that the vehicle should be operated in an electric mode. Alternatively, if the engine torque request is less than a threshold, the vehicle may switch over to the electric mode of operation.

If method 800 determines that the vehicle is to be operated in an electric mode at 806, then method 800 proceeds to 808. At 808, method 800 includes operating the vehicle in the electric mode with the system battery being used to propel the vehicle and meet the operator torque demands. In some examples, even if an electric mode is selected at 808, the routine may continue monitoring the vehicle torque demand and other vehicle operating conditions to see if a sudden shift to engine mode (or engine assist mode) is to be performed. Specifically, while in the electric mode, at 810 a controller may determine whether a shift to engine mode is requested.

However, if at 806, it is determined that the vehicle is not to be operated in an electric mode, then method 800 proceeds to 812. At 812, the vehicle may be operated in the engine mode with the engine being used to propel the vehicle and meet the operator torque demands. Alternatively, the vehicle may operate in an assist mode (not shown) with vehicle propulsion due to at least some energy from the battery and some energy from the engine.

Figure 9:
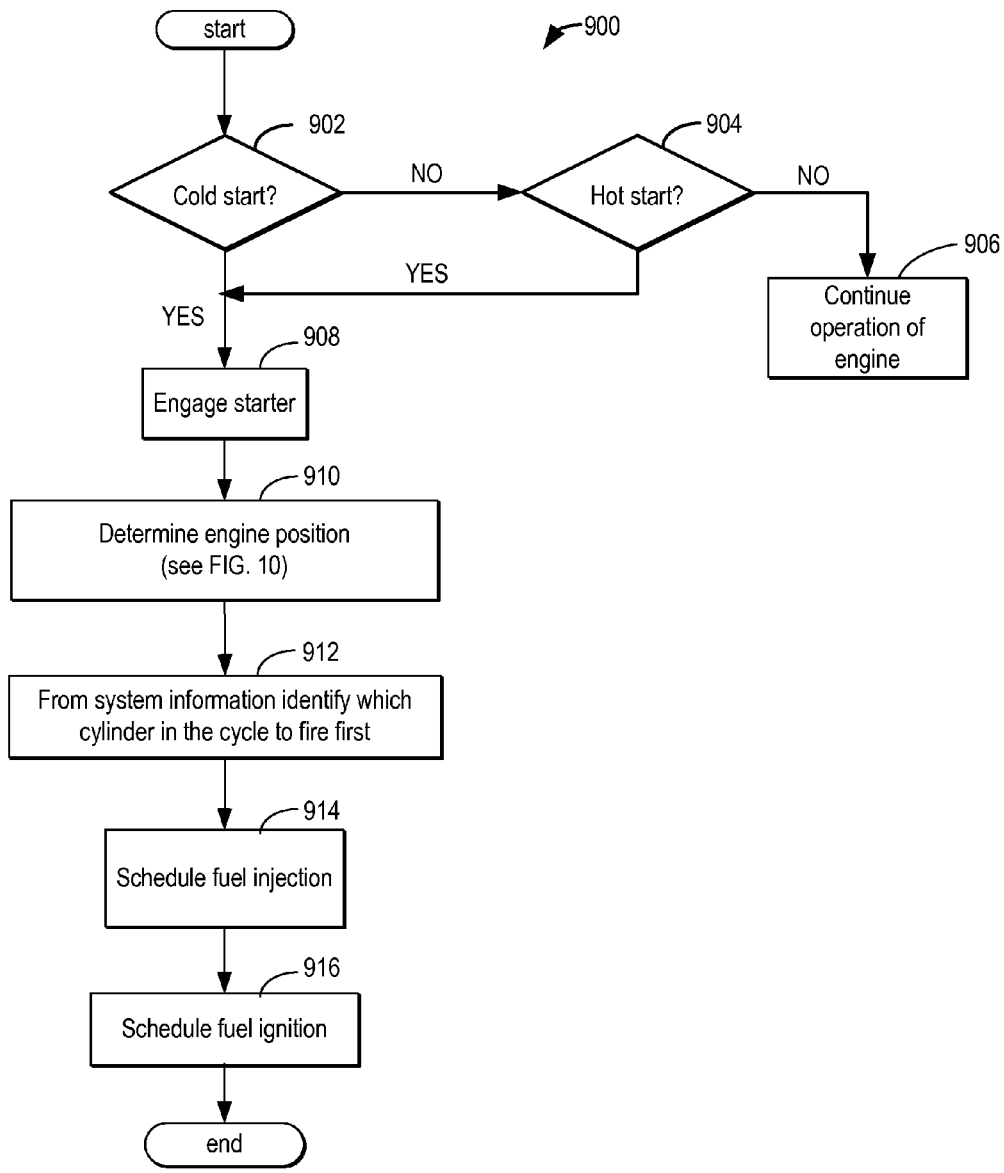
FIG. 9 shows an example method for starting or re-starting the engine during an operation of an example vehicle drive cycle.

If an engine mode is requested at 812, or if a shift from electric mode to engine mode occurs at 810, 814 shows that the vehicle may start or re-start the engine. An example method 900 for starting or re-starting the engine during operation of a vehicle drive cycle is shown in FIG. 9.

At 902, method 900 includes determining if an engine cold start is to be performed. For example, an engine cold start may be confirmed in response to an engine start from rest when an exhaust light-off catalyst is below a threshold temperature (e.g., a light off temperature) or while an engine temperature (as inferred from an engine coolant temperature) is below a threshold temperature. In one example, a first engine start during a drive cycle may be a cold start. That is, when an engine is started to initiate vehicle operation in an engine mode, a first number of combustion events of the engine from rest to cranking may be at a lower temperature and may constitute a cold start. As another example, a vehicle may be started in an electric mode and then shifted to an engine mode.

Herein, a first engine start during a transition from the electric mode to the engine mode, in a given vehicle drive cycle, may be a cold start.

If an engine cold start is confirmed at 902, method 900 proceeds to 908 to engage an engine starter. For example, an engine controller may send a signal to the starter as a means of commencing start-up activities. In some embodiments, an engine starter may be optionally included since at least one piston is always located at the beginning of a power stroke in the drive cycle. For these vehicles, a controller may use a laser system coupled to a cylinder to identify the next firing cylinder and commence engine reactivation by injecting fuel directly into the cylinder for ignition.

At 910, method 900 includes determining an engine position. For example, based on selected criteria the engine controller may be configured to determine the position of the engine in order to identify and position a first firing cylinder to initiate combustion during engine activation. For example, as described above, each cylinder may be coupled to a laser system capable of producing either a high or low energy optical signal. When operating in the high energy mode, the laser may be used as an ignition system to ignite the air/fuel mixture. In some examples, the high energy mode may also be used to heat the cylinder in order to reduce friction in the cylinder. When operating in the low energy mode, a laser system, which also contains a detection device capable of capturing reflected light, may be used to determine valve positions within a cylinder, in addition to the position of the piston. For example, the position of intake valve 352 and exhaust valve 354 may be determined by laser system 92. In some embodiments, each cylinder of engine 20 may include at least two intake poppet valves and at least two exhaust poppet valves located at an upper region of the cylinder. The engine may further include a cam position sensor whose data may be merged with the laser system sensor to determine an engine position and cam timing. During certain modes of operation, for instance, when the engine is running, reflected light may produce other advantageous optical signals. For instance, when light from the laser system is reflected off of a moving piston, it will have a different frequency relative to the initial light emitted. This detectable frequency shift is known as the Doppler effect and has a known relation to the velocity of the piston. The position and velocity of the piston may be used to coordinate the timing of ignition events and injection of the air/fuel mixture. Position information may also be used to determine which cylinder fires first during start-up activities.

At 912, method 900 includes identifying which cylinder in a cycle to fire first. For example, piston and valve position information may be processed by the controller in order to determine where the engine is in its drive cycle. Once the engine position has been determined, the controller may identify which cylinder to ignite first upon reactivation.

At 914, method 900 includes scheduling fuel injection and adjusting fuel injection based on the determined engine position. For example, the controller may process engine position and cam timing information to schedule the next cylinder to be injected with fuel in the drive cycle. At 916, method 900 includes scheduling fuel ignition. For example, once fuel injection has been scheduled for the next cylinder in the firing sequence, the controller may subsequently schedule ignition of the air/fuel mixture by the laser system coupled to the next firing cylinder in order to commence engine operation.

Returning to 902, if an engine cold start is not confirmed, the routine proceeds to 904 to determine if an engine hot start is present. For example, an engine hot start may be confirmed in response to an engine start from rest when an exhaust light-off catalyst is at or above a threshold temperature (e.g., a light off temperature) or while an engine temperature (as inferred from an engine coolant temperature) is at or above a threshold temperature. In one example, an engine may be started to initiate vehicle operation in an engine mode, and after a duration of vehicle operation, the engine may be temporarily stopped to perform an engine idle-stop or to continue vehicle operation in an electric mode. Then, after a duration of operation in the electric mode, or when restart from idle-stop conditions are met, the engine may be restarted (e.g., from rest) to re-initiate vehicle operation in the engine mode. During these conditions, a first number of combustion events of the engine from rest to cranking may be at a higher temperature (due to the prior engine operation) and may constitute a hot start.

If a hot start is not confirmed at 904 based on information received from the control systems, method 900 proceeds to 906 to continue operation of the engine. For example, in response to a determination that the vehicle propulsion system is functioning in engine mode engine operation may continue to be monitored during the vehicle drive cycle.

Figure 10:
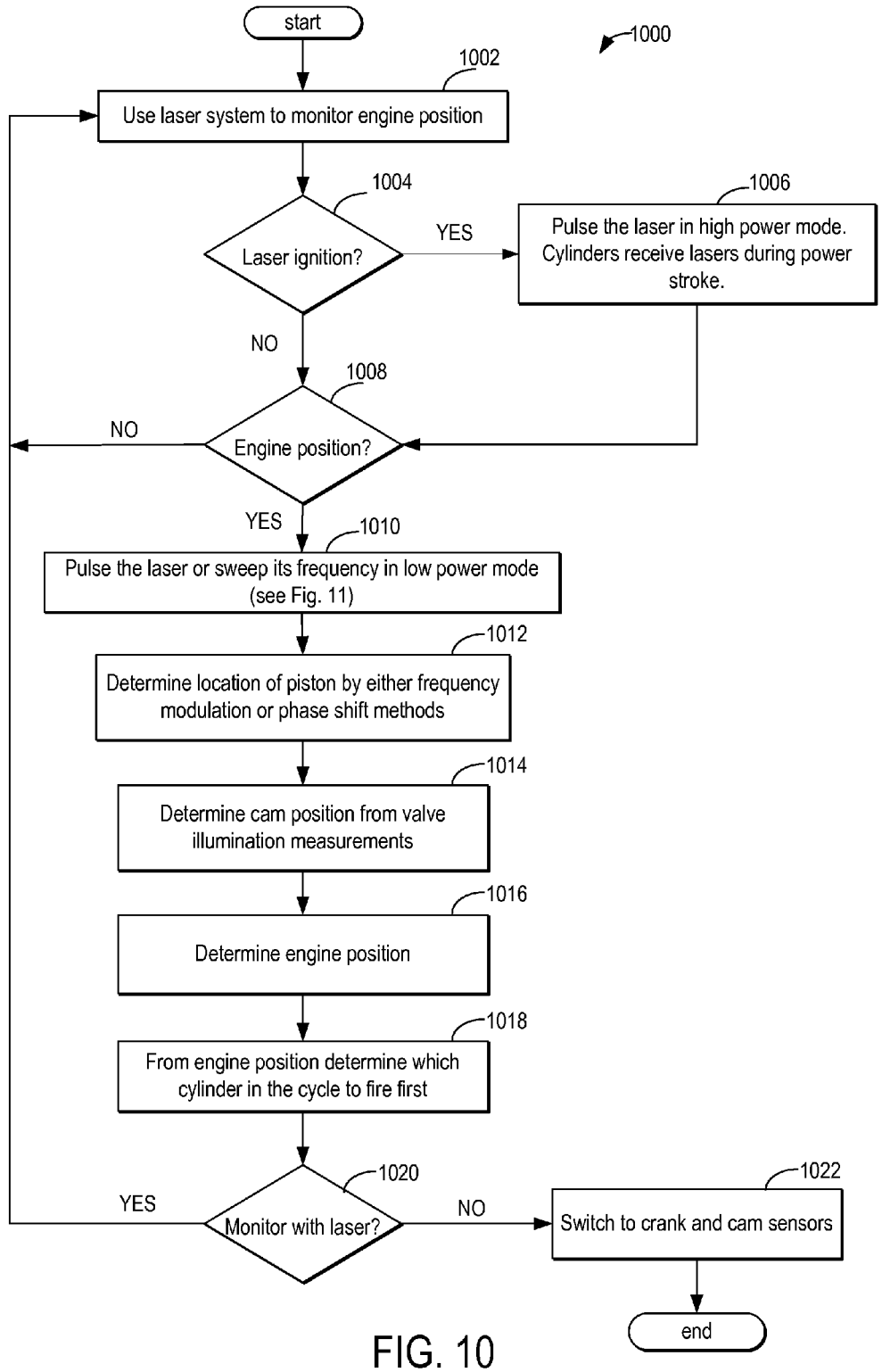
FIG. 10 shows an example method for operating the laser system in two modes based on the operational state of an internal combustion engine.

FIG. 10 shows an example method 1000 for operating a laser system 92 in two power modes based on the operational state of an internal combustion engine 20. As shown in the example method of FIG. 10, a laser system may operate in two power modes. For instance, a laser ignition system coupled to a cylinder may operate in a low power mode to measure CID and piston position, velocity, etc. and a high power mode to ignite the air/fuel mixture injected into a combustion chamber 30. In the embodiment shown, a controller may be used to determine where the engine is in its drive cycle. After processing the engine position information, a signal may be sent to the laser system in order to communicate this information. The signal may be electrical in nature or it may be sent via optical, mechanical or some other means.

At 1002, method 1000 includes using at least one laser system to monitor engine position. For example, in FIG. 4, laser system 451 may be used to determine the position of intake valve 414 and/or the position of exhaust valve 412 in addition to the position of the piston in cylinder 404.

At 1004, method 1000 includes determining if a laser ignition is to be performed. For example, the laser system 92 may receive information from a controller and use it to determine which operational mode to use.

If at 1004, it is determined that a laser ignition is to be performed, then method 1000 proceeds to 1006. At 1006, method 1000 includes, pulsing a laser in a high power mode in a cylinder of the engine. As described above with reference to FIGS. 2-4, the engine controller may be configured to identify a first firing cylinder in which to initiate combustion during engine reactivation from idle-stop conditions. For example, if controller 12 determines a high-powered pulse should be delivered to cylinder chamber 404, at 1006 laser system 451 may generate a high energy pulse to ignite the air/fuel mixture in that chamber. After engine reactivation, the laser system may then be used to monitor the engine position.

If, however, it is determined that a laser ignition is not to be performed at 1004, then method 1000 proceeds to 1008. At 1008, method 1000 includes determining whether a piston position is requested. For example, if controller 12 determines no high energy pulse is necessary, at 1008 it may optionally decide whether a laser system should generate low energy pulses to measure, for example, the position of the engine prior to reactivation from cold start conditions.

If a measurement of engine position is requested at 1008, then method 1000 proceeds to 1010. For example, at 1010, a low power pulse may be delivered by laser system 451 to determine the positions of the cams and piston within cylinder 404. Likewise, laser systems 453, 457 and 461 may also deliver low powered pulses to determine the positions of the cams and pistons within cylinders 408, 410 and 406, respectively.

At 1012, method 1000 includes using a laser system to determine positional information for a piston within its cylinder. For example, the location of the piston may be determined by frequency modulation methods using frequency-modulated laser beams with a repetitive linear frequency ramp.

At 1014, method 1000 includes using a laser system to determine positional information for intake or exhaust valves using valve illumination measurements. For instance, in the example shown in FIG. 5, controller 12 processed data collected by laser system 461 during the engine drive cycle to determine that intake valve 424 was open. The controller further determined that exhaust valve 426 was closed based on, for example, engine operations during the drive cycle. That is, if the intake valve is open, the exhaust valve is closed.

At 1016, method 1000 includes using the cam and piston positional information to determine the position of the engine. For example, in FIG. 6, the engine controller 12 performed a series of computations to calculate the position of the engine based on data received from multiple laser systems. The data collected may be further processed to calculate other system information, for example, the crank angle of crankshaft 40. Alternatively, the controller may use the position of the engine to ensure that fuel delivery within the engine is synchronized.

At 1018, method 1000 includes identifying which cylinder in the cycle to fire first. For example, in the description of FIGS. 6-7, the controller used the laser systems to measure the positions of the cams and pistons within their cylinders. This information was then used to determine the position of the engine. From the position of the engine identified, the controller was able to identify and schedule the next cylinder in the drive cycle to fire.

At 1020, method 1000 includes determining if engine monitoring with a laser is to continue. Once the next firing cylinder has been identified, the controller may determine whether engine performance is monitored by the laser systems. If the controller decides not to use the laser systems to monitor the engine position, at 1022, the controller may, for example, optionally use crankshaft sensors 118 or cam position sensors 55 and 57 in order to monitor the position of the engine.

Figure 11:
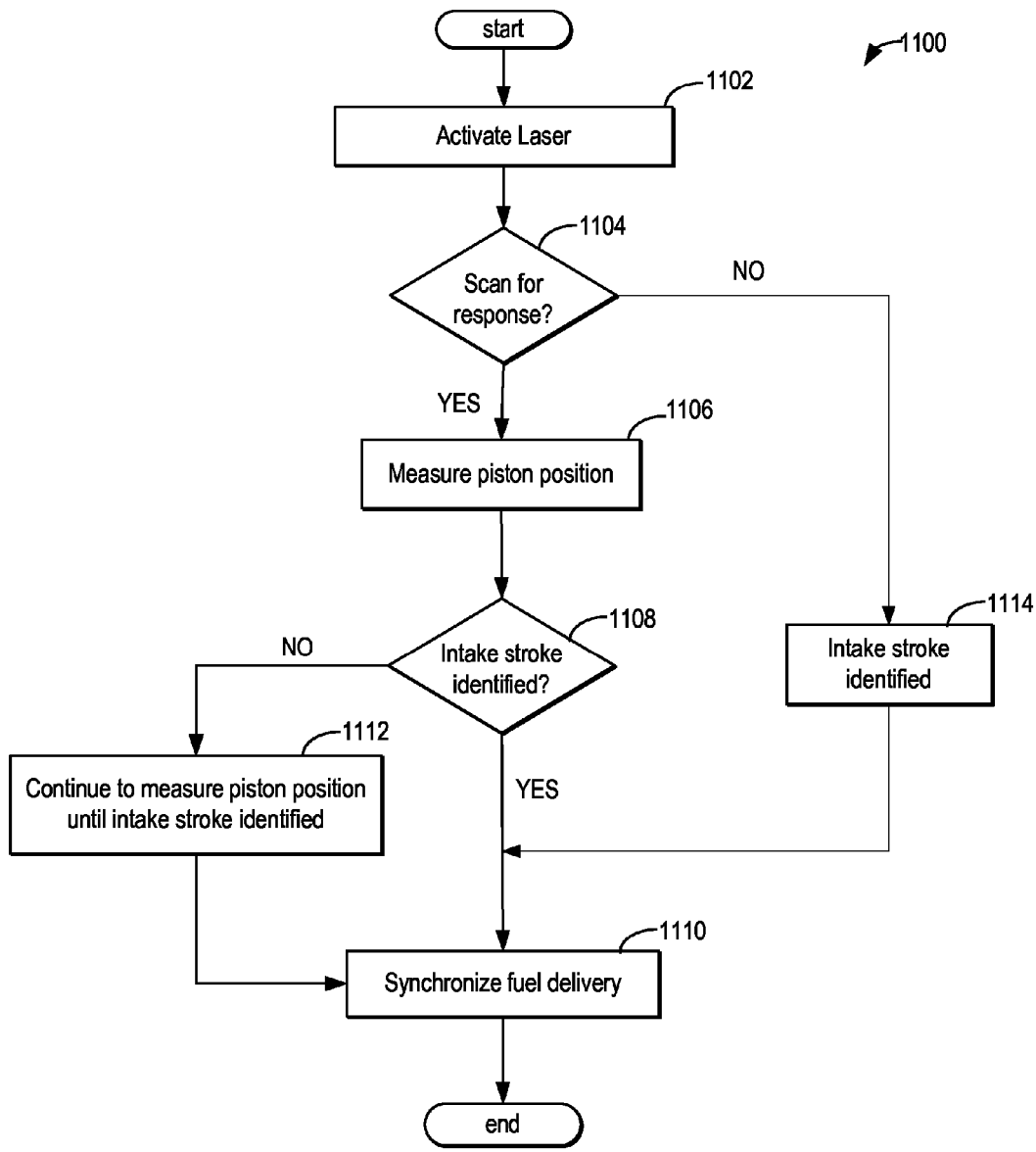
FIG. 11 shows an example method for synchronizing fuel delivery based on two detection modes of a laser.

FIG. 11 shows an example method 1100 for synchronizing fuel delivery based on detection of different signals within the drive cycle. Method 1100 may be carried out by the control system 41, for example. The method includes using a laser system in a low power mode to monitor the position of an engine. The laser system may further include sensors to determine the position of a piston in a cylinder and/or sensors to identify valve positions in the engine drive cycle. Data collected during various strokes of the engine cycle may then be processed by a controller and used to synchronize and schedule fuel delivery.

At 1102, a controller may activate the laser system in order to monitor engine position. For example, if the period of time the engine has idled is greater than a threshold, the controller may optionally determine that the vehicle should be operated in an electric mode. The engine may subsequently cease operation and complete a few successive cycles before arriving at a final resting position. During this period, the controller may be configured to activate the laser system in order to monitor the position of the engine as a means of identifying the final resting position of the engine. A first firing cylinder may be identified in which to initiate combustion during engine reactivation from the idle-stop conditions.

At 1104, the controller may be programmed to use the activated laser system to perform a low powered scan in order to determine the position of the engine based on light responses sensed within the cylinder. If the position of the engine is to be determined, at 1106 the laser system may operate in a low power mode to emit low energy pulses that can be detected by a laser detector. For example, in FIG. 5, a series of low energy pulses were emitted by a laser system and subsequently reflected off of the top of the piston within a cylinder. The laser detector then detected reflected pulses in LD1 to determine the location of the piston relative to TDC.

After piston position is identified, at 1108 the controller may further use a laser system to determine whether valve timing information should be collected. Returning to the example shown in FIG. 5, a laser system in LD2 monitored the position of, for example, intake valve 426. When combined with the piston position information determined from the first mode of operation, the controller was then able to identify the position of the engine. At 1108, if a sampling of the data collected by a laser system is unable to determine an intake stroke or engine position, then 1112 shows that the system may continue to collect data in the low power mode until an intake stroke or engine position is identified.

Once the position of the engine has been determined, at 1110 the controller may use the engine position to synchronize fuel delivery. This may be done in response to estimated operating conditions which may include, for example, an indication of vehicle operator requested output or torque (e.g., based on a pedal position), a fuel level at the fuel tank, engine fuel usage rate, engine temperature, state of charge (SOC) of the on-board energy storage device, ambient conditions including humidity and temperature, engine coolant temperature, climate control request (e.g., air-conditioning or heating requests), etc.

Returning to 1104, if the controller decides that a laser system should not be used to scan for engine position, 1114 indicates that the intake stroke may have been identified. For example, upon restarting from idle-stop conditions, the position of the engine may be stored in CPU 102 within control system 41. In this example, control system 41 may rely on data stored in the CPU to determine a first firing cylinder and proceed to 1110 in order to synchronize fuel delivery.

Figure 12:
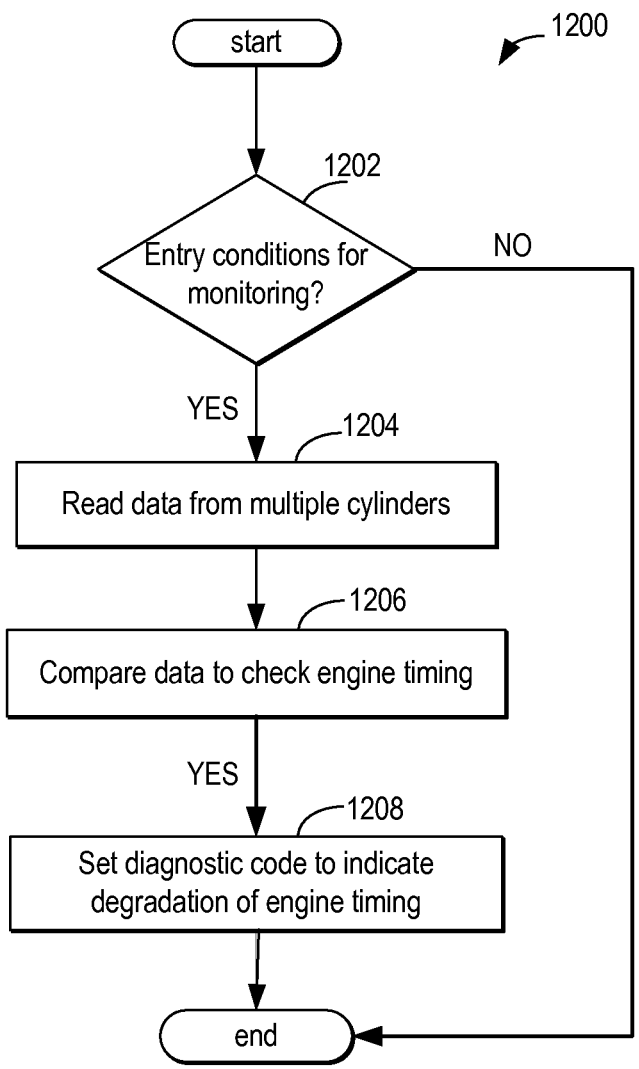
FIG. 12 shows an example method for identifying engine degradation in accordance with the disclosure.

FIG. 12 is a flow chart illustrating an example method 1200 for monitoring an engine using one or more laser systems, as described above. Method 1200 may be carried out by the control system 41, for example. The method includes example actions to diagnose an engine based on a laser measurement approach in combination with other system information acquired. For instance, in one embodiment, if an engine contains at least two cylinders whose pistons are coupled via the crankshaft, at least one laser system may be used to measure the position of at least one cylinder to determine the position of a piston in its cylinder chamber 30. Because the location of a piston within its cylinder chamber 30 may be related to the location of at least one other piston, a position measurement may be used to assess whether the set of pistons are operating within, for example, acceptable timing tolerance limits during the engine drive cycle. Further, the measurements from a first laser system in a first cylinder may be used to identify degradation in another cylinders' laser-based measurement. Further still, the measurements from a first laser system in a first cylinder may be used to identify degradation of the engine crankshaft position determined via sensor 118.

At 1202, the control system may use system information collected to determine whether a set of conditions exists that enable monitoring. In one embodiment, the set of conditions may be predefined and stored, for instance, in look-up tables. In another example, the set of conditions may include whether the engine is rotating but before combustion, and a plurality of cylinders each include a laser ignition system and an IR sensor.

If the controller determines that a diagnostic procedure is warranted, at 1204 the controller may collect data from a cylinder in order to identify whether degradation has occurred. If, upon a sampling of the system conditions, no diagnostic procedure is triggered, the routine ends.

At 1206, the control system compares specific metrics to data from other engine cylinders in order to assess the overall engine performance during the drive cycle. In one embodiment, the data compared may be collected by each laser system at a time directed by the laser system, or in a second embodiment, specific reference data may be stored in look-up tables to be compared directly to the data measured. Diagnostic comparisons are taken to determine the current state of the engine system. In one example, the routine may compare a plurality of piston position measurements from a plurality of cylinders sampled at a common time, or within a threshold time of one another. For example, a laser-based measurement from a first cylinder ($\Delta x1$) may be compared to the laser-based measurement of a second cylinder ($\Delta x2$) taken at the same time, where the first and second cylinders are known to have a specified relationship between the two pistons, such as illustrated in FIG. 4. In this way, the piston positions can be compared to one another and if they differ more than a threshold amount, then degradation can be indicated at 1208 as discussed below. In another example, a plurality of laser-based positional measurements may be generated from a first cylinder during engine rotation and compared to engine position changes indicated from crankshaft sensor 118. If the change in position of the piston via the laser-based measurement disagrees in the change in position indicated from the crankshaft sensor, again degradation can be indicated. In still another example, three or more laser-based position measurements can be generated from three different cylinders of the engine and compared to one another to identify which cylinder's measurement, if any, disagrees with the other two or more measurements by a threshold. Further still, the laser-based position measurements may be compared with camshaft positions indicated via the camshaft sensor to identify disagreements and thus potential degradation.

If a decision is made that the timing of the pistons is greater than a threshold, 1208 shows that a signal may be sent to the controller directing it to set a diagnostic code indicating degradation of the engine timing has occurred.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
operating a laser ignition device in an engine cylinder;
synchronizing fuel delivery based on engine and cylinder valve position laser sensed over different strokes of an engine cycle, the engine position based on a reflected laser signal, the cylinder valve position based on a blocked laser signal; and
igniting an air and fuel mixture in the cylinder with the laser ignition device.

2. The method of claim 1, wherein synchronizing fuel delivery includes uniquely identifying engine piston position and cylinder valve position to identify a cylinder stroke of an engine.

3. The method of claim 2, wherein identifying engine piston position and cylinder valve position includes operating the laser ignition device in a first, lower power mode of operation during a compression, power, and exhaust stroke of the engine cycle to identify engine piston position, and operating the laser ignition device in a second, lower power mode during an intake stroke of the engine cycle to identify intake valve position, and igniting the air and fuel mixture includes operating the laser ignition device in a higher power mode of operation.

4. The method of claim 3, wherein the engine position based on the reflected laser signal includes the laser ignition device operating in the first, lower power mode to detect the engine piston position based on a laser signal reflected off of a piston of the cylinder.

5. The method of claim 3, wherein the cylinder valve position based on the blocked laser signal includes the laser ignition device operating in the second, lower power mode to detect a cylinder valve position based on a laser signal reflected off of a cylinder valve, the cylinder valve substantially blocking the laser signal.

6. The method of claim 5, wherein determining valve position includes determining whether an intake valve of the cylinder is open or closed.

7. The method of claim 6, wherein determining engine position is based on detecting each of reflected light pulses and reduced signals from substantially blocked laser pulses within the cylinder.

8. The method of claim 1, further comprising determining engine rotational speed responsive to the laser operation, and adjusting fuel injection based on the laser sensed engine position and further based on engine speed.

9. The method of claim 1, wherein fuel injection timing and amount is based on the laser sensed engine and cylinder valve position and further based on engine speed.

10. The method of claim 1, wherein cylinder selection for a first fuel injection is based on the laser sensed engine and cylinder valve position.

11. The method of claim 2, wherein uniquely identifying engine piston position includes at least one of a pulsed measurement by the laser ignition device in a low power mode; and frequency-modulating the laser ignition device with a repetitive linear frequency ramp; and
determining piston position based on a distance indicated by an offset of a frequency measured by sensed reflections of the laser ignition device by a piston; and determining a valve position based on light in a cylinder.

12. The method of claim 2, wherein uniquely identifying engine piston position includes identifying a Doppler shift in a frequency reflected by a piston and measured by a sensor coupled to a cylinder.

13. The method of claim 1, further comprising indicating engine speed based on a plurality of identified engine positions via the laser ignition device.

14. A method, comprising:
synchronizing a first combustion event from rest of an engine start by:
operating a laser ignition device coupled to an engine cylinder throughout an engine cycle to identify each of engine piston position and cylinder valve position in response to sensed light in the cylinder, the piston position identified during a compression, power, and exhaust stroke of the engine cycle based on a reflected laser signal, the cylinder valve position identified during an intake stroke of the engine cycle based on a blocked laser signal; and
igniting an air and fuel mixture in the cylinder with the laser ignition device, a timing of the igniting based on the identified engine piston and cylinder valve position.

15. The method of claim 14, further comprising injecting fuel responsive to laser sensed engine piston and cylinder valve position to generate a mixture.

16. The method of claim 15, wherein fuel is directly injected into the cylinder.

17. The method of claim 15, wherein fuel is injected into an intake manifold to generate the mixture before entering the engine cylinder.

18. The method of claim 14, wherein the engine piston position is further identified based on camshaft and crankshaft position.

19. A method, comprising:
shutting down an engine in response to idle-stop conditions;
synchronizing a first combustion event from shutdown of an engine restart by operating a laser ignition device in an engine cylinder to emit lower power pulses throughout each stroke of an engine cycle and identifying engine position and cylinder valve position in response to sensed light in the cylinder; and
after identifying engine and cylinder valve position, operating the laser ignition device to emit higher power pulses to ignite an air and fuel mixture in the cylinder, a timing of the igniting based on the identified engine and cylinder valve position.

* * * * *